UNITED STATES PATENT OFFICE.

ROBERT E. SCHMIDT AND ANDREAS JAKOBI, OF ELBERFELD, GERMANY, ASSIGNORS TO FARBENFABRIKEN OF ELBERFELD CO., OF NEW YORK, N. Y.

ANTHRAQUINONE DYE AND PROCESS OF MAKING SAME.

SPECIFICATION forming part of Letters Patent No. 675,573, dated June 4, 1901.

Application filed January 22, 1901. Serial No. 44,318. (No specimens.)

*To all whom it may concern:*

Be it known that we, ROBERT E. SCHMIDT and ANDREAS JAKOBI, doctors of philosophy, chemists, (assignors to the FARBENFABRIKEN OF ELBERFELD COMPANY, of New York,) residing at Elberfeld, Germany, have invented a new and useful Improvement in New Anthraquinone Dyes and Processes of Making Same; and we hereby declare the following to be a clear and exact description of our invention.

Our invention relates to the manufacture of new dyestuff sulfonic acids of the anthracene series by causing sulfonating agents to act on tetraälphylamidoanthraquinone derivatives having the following general formula:

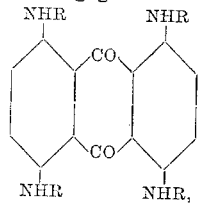

(R meaning in this formula an alphyl radical, such as phenyl, tolyl, xylyl, or the like.) The said anthraquinone derivatives can be obtained, for instance, by heating 1.5 or 1.8 dihalogen-alpha-dinitroanthraquinones having the formulæ:

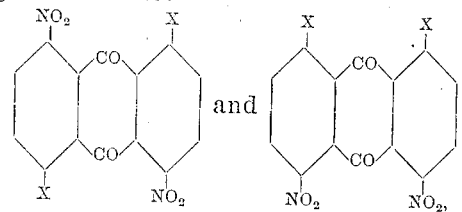

(X meaning a halogen atom,) with primary aromatic amins, such as anilin, paratoluidin, xylidin, or the like. The said dinitroanthraquinones can be produced by nitrating the corresponding alpha-halogen anthraquinones.

The new dyestuff sulfonic acids obtainable by our new process are, in a dry state, dark powders, which are soluble in water and in ammonia, with from yellowish-green to greenish-blue color. They dye unmordanted and chrome-mordanted wool from yellowish-green to bluish-green shades.

In order to produce the said tetraälphylamidoanthraquinones we can proceed, for instance, as follows, the parts being by weight: Ten parts of 1.5-dichloro 4.8-dinitroanthraquinone are mixed with one hundred parts of paratoluidin. This resulting mixture is heated to about from 140° to 180° centigrade until the melt has assumed a green color. The reaction mass is then poured into dilute hydrochloric acid, by means of which operation the condensation product is separated. Subsequently it is dried and recrystallized from pyridin. The resulting body, which represents dark crystals, is soluble in anilin and in cold concentrated sulfuric acid with a green color and soluble in chloroform with a bluish-green color. In order to transform this condensation product into the new dyestuff sulfonic acid, ten parts of the finely-pulverized compound are stirred into one hundred parts of sulfuric monohydrate. The resulting solution is then heated to about from 80° to 100° centigrade until a test portion is clearly dissolved by water. Subsequently the reaction mass is poured into about from one thousand to fifteen hundred parts of water. The dyestuff sulfonic acid thus produced, which is rather difficultly soluble in dilute acids, partially separates. The rest is precipitated by the addition of common salt. It is filtered off and dried. The sodium salt of the new dyestuff sulfonic acid thus obtained is, when dry and pulverized, a dark powder, which is readily soluble in water and in ammonia with a green color. It is soluble with difficulty in hot alcohol with a greenish-blue color. By concentrated sulfuric acid (of 66° Baumé) it is dissolved, yielding a greenish-blue solution, the color of which is not changed on the addition of a small quantity of ice, while on adding a larger quantity of ice the dyestuff sulfonic acid is separated in the shape of green flakes.

The new coloring-matter dyes unmordanted and chrome-mordanted wool green shades.

The process proceeds in an analogous manner if other of the above-defined alphylamidoanthraquinones are treated with sulfonating agents.

Having now described our invention and in what manner the same is to be performed, what we claim as new, and desire to secure by Letters Patent, is—

1. The process for producing new anthraquinone dyestuffs, which process consists in first treating 1.4.5.8-tetraalphylamidoanthraquinone derivatives having the following general formula:

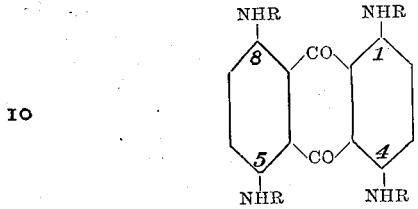

in which formula R means an alphyl radical, with sulfonating agents and then isolating the resulting dyestuff sulfonic acids from the reaction mixture, substantially as hereinbefore described.

2. The process for producing a new anthraquinone dyestuff, which process consists in first treating 1.4.5.8-tetraparatoluidoanthraquinone having the formula:

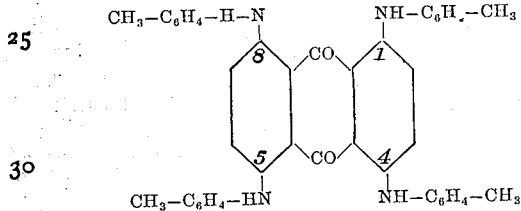

with sulfonating agents, and then isolating the resulting dyestuff sulfonic acid from the reaction mixture, substantially as hereinbefore described.

3. The herein-described new anthraquinone dyestuffs, which, when dry and pulverized, are dark powders soluble in water and in ammonia with from yellowish-green to greenish-blue color, dyeing unmordanted and chrome-mordanted wool from yellowish-green to bluish-green shades, substantially as hereinbefore described.

4. The herein-described new anthraquinone dyestuff obtainable by sulfonating 1.4.5.8-tetraparatoluidoanthraquinone, which dyestuff is, in the shape of its sodium salt, when dry and pulverized, a dark powder readily soluble in water and in ammonia with a green color, being soluble with difficulty in hot alcohol with a greenish-blue color, being dissolved by concentrated sulfuric acid (of 66° Baumé) yielding a greenish-blue solution the color of which is not changed on the addition of a small quantity of ice, while on adding a larger quantity of ice the dyestuff sulfonic acid separates in the shape of green flakes; dyeing unmordanted and chrome-mordanted wool green shades.

In testimony whereof we have signed our names in the presence of two subscribing witnesses.

ROBERT E. SCHMIDT.
ANDREAS JAKOBI.

Witnesses:
OTTO KÖNIG,
EDUARD FERTIG.